July 11, 1939.  R. D. ALLISON  2,166,034
FOCUSING DEVICE FOR MICROSCOPES
Filed May 3, 1937
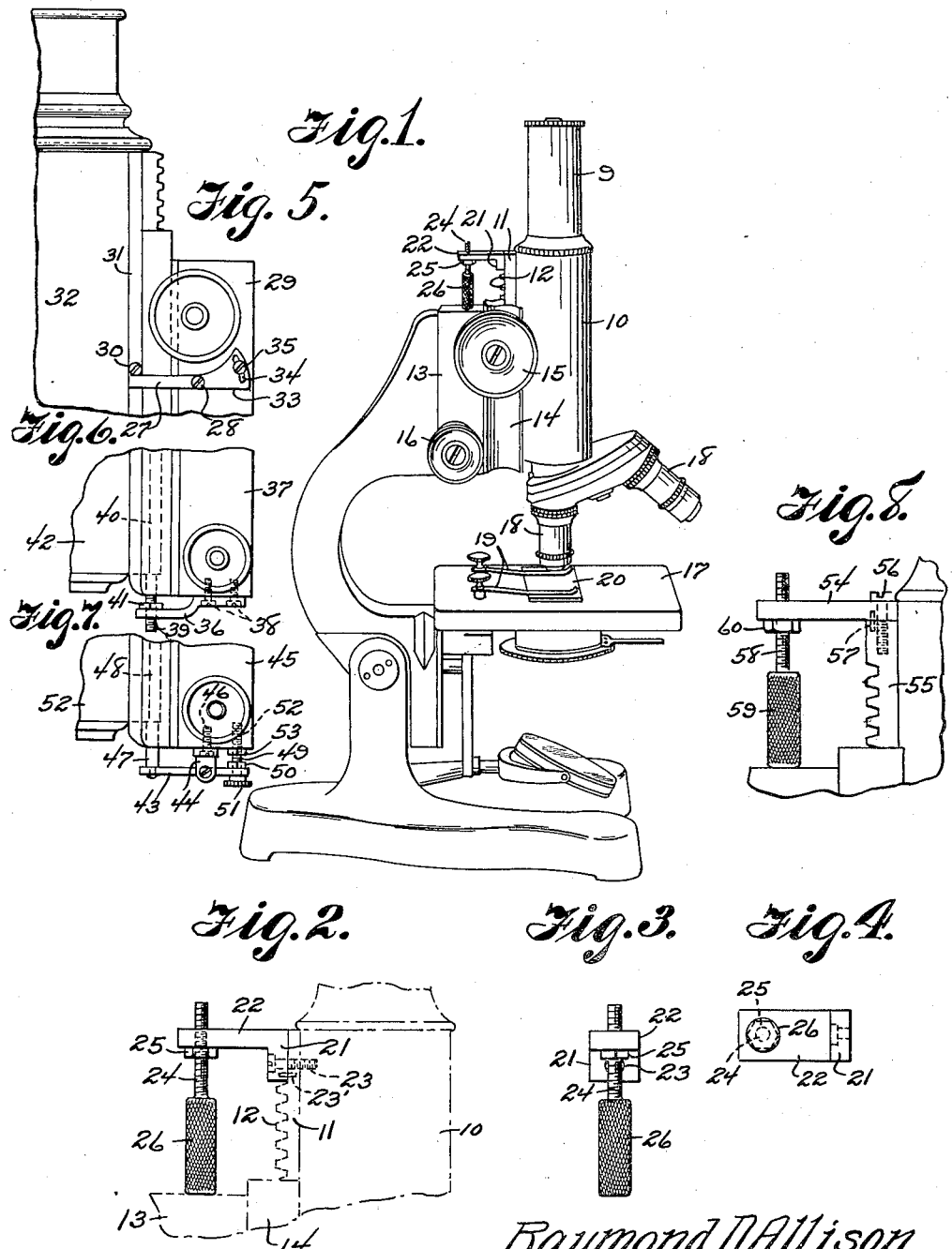
Raymond D. Allison
INVENTOR
BY Victor J. Evans & Co.
ATTORNEYS Patented July 11, 1939

2,166,034

UNITED STATES PATENT OFFICE 2,166,034

FOCUSING DEVICE FOR MICROSCOPES

Raymond D. Allison, Los Angeles, Calif.

Application May 3, 1937, Serial No. 140,533

7 Claims. (Cl. 88—39)

This invention relates to focusing devices for microscopes and has for an object to provide means by which the focusing operation may be quickly and safely accomplished without danger of damaging the lenses of the objectives, slides placed upon the stage of the microscope, condenser, or iris diaphragm through forceful contact with the objective due to improper manipulation of the focusing adjustments of the microscope.

A further object of the invention is to provide a device which will permit focusing of any objective in the normal manner but will stop the downward action of both coarse and fine adjustments at a point which will not permit the front lens of the objective to contact with the object slide, the device being so constructed as not to interfere with any adjustment of the microscope until its focusing terminus is reached and then at that point the device renders both coarse and fine adjustments inactive.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a perspective view of a microscope embodying one form of the invention.

Figure 2 is a side elevation of the device constituting the subject matter of the invention with associated parts of the microscope shown in dotted lines.

Figure 3 is a front elevation of the device.

Figure 4 is a bottom plan view of the device.

Figure 5 is a detail side elevation of a modified form of the device.

Figure 6 is a detail side elevation of another modified form of the device.

Figure 7 is a side elevation of still another modified form of the device.

Figure 8 is a detail side elevation of a modified form of bar for supporting the motion limit screw shown in Figure 1.

Referring now to the drawing in which like characters of reference designate similar parts in the various views, 9 indicates the draw tube, 10 the body tube, 11 the body tube slide, 12 the body tube rack representing the coarse adjustment body, 13 the upper portion of the pillar arm, 14 the fine adjustment body, 15 the coarse adjustment pinion head, 16 the fine adjustment pinion head, 17 the stage, 18 the objectives and 19 the clamps for holding a slide 20 on the stage, these parts being common to all microscopes. The fine adjustment body is mounted for vertical adjustment on the pillar arm, and the coarse adjustment body is mounted for vertical adjustment on the fine adjustment body while the fine adjustment body is disposed between the coarse adjustment body and the pillar arm.

In practice, in bringing the instrument to focusing position by manipulation of the coarse adjustment the body tube of the instrument moves quite rapidly and the focusing point may be passed in which case further down movement of the body tube by either coarse or fine adjustments brings the objective into contact with the slide or parts of the microscope below the slide resulting in damage.

With this objection in mind the invention provides a substantially straight bar 22 having a downwardly directed foot 21 that is secured to the rear face of the body tube slide or rack at the top thereof by a screw 23 and pin 23' passed into the tube slide so that the bar moves as a unit up and down with the tube. The bar extends from the coarse adjustment slide or rack across the fine adjustment body and a screw 24 is screw threadedly engaged with the free end of the bar and depends from the bar between the bar and the stationary pillar arm. The screw is provided with a lock nut 25 and also is provided with an elongated knurled cylinder head 26.

By turning the head 26 the screw may be adjusted vertically to project any desired distance from the bar 22 and locked in this adjusted position by tightening the nut 25. The purpose of this vertical adjustment of the screw is to provide an adjustable control of the free working distance between the objective 18 and the object slide 20 by stopping movement of the bar at a predetermined point in its travel as a unit with the coarse adjustment slide or rack.

In operation when the body tube is being moved downward by means of either the coarse or fine adjustment the knurled head 26 of the screw will strike against the stationary pillar arm 13 outside of and beyond the fine adjustment body 14 immediately upon the body tube passing the focusing point. As a result the objective 18 can never at any time be impinged against the slide 20 or be advanced through the stage to injure other parts of the microscope on the bottom of the stage.

It will be pointed out that once the proper adjustment of the screw 24 is made, it never again need be adjusted unless a different thickness object slide is used. Even when a different magnification is desired, and a selected objective is rotated into focusing position on the nose piece of a parfocalized microscope the screw 26 prevents the objective striking against the object slide even when some manipulation of the fine adjustment is made, as in practice when the stop arm and screw is in use it will be found that the fine adjustment body instead of traveling lower to a dangerous position will begin to rise and thus prevention of breakage is assured at all times.

In Figures 5, 6 and 7 modified forms of stop arms and screws are shown, and in these figures the microscope is turned around to a position 180° from the position shown in Figure 1, that is, the body tube is on the left of each figure instead of on the right of the figure as shown in Figure 1.

The modification shown in Figure 5 comprises a bar 27 which is adjustably mounted intermediate its ends by means of a pivot screw 28 threaded into the pillar arm 29. A stop pin 30 is secured to the side of the body tube slide or rack 31 and is adapted to engage the end of the bar 27 and stop dangerous movement of the body tube 32 toward the objective slide. The bar is provided with a segmental shaped end 33 having an arcuate slot 34 concentric with the pivot pin and receiving an adjusting screw 35 which is secured to the pillar arm. The screw 35 is loosened when the bar 27 is to be adjusted and as soon as the desired terminus of the body tube is ascertained the bar is rocked on the pivot screw 28 to a position where the bar contacts with the stop pin 30 and then the adjusting screw 35 is tightened to maintain the bar rigid in place in this adjusted position. The end of the bar may be graduated for convenience in making future adjustments and in all forms of the invention wherever desired scales for facilitating adjustments may be arranged wherever necessary.

Another modification of the invention is shown in Figure 6 in which a bar 36 is fixed to the bottom of the pillar arm 37 by screws 38 or other connectors. The free end of the bar is offset downwardly and is equipped with a screw 39 which extends upwardly in the path of movement of the body tube slide or rack 40 and is adjustably secured in place by a lock nut 41. The screw 39 engages the body tube slide or rack and prevents downward movement of the body tube 42 to a dangerous point below the focusing point.

Still another embodiment of the invention is shown in Figure 7 in which a bar 43 is pivoted on a bracket 44 which is secured to the bottom of a pillar arm 45 by a screw 46 or other connector. One end of the bar is equipped with an upstanding pin 47 which projects into the path of the body tube slide or rack 48. The other end of the bar is equipped with a screw 49 having a shoulder 50 in contact with the top face of the bar 43 and also is provided with a shank of reduced size to extend through the bar 43. The end of the screw is further reduced to receive a knurled nut 51 adapted to engage the shank and permit the screw 49 to turn freely on the bar 43. The other end of the screw 49 engages in a threaded opening 52 formed in the underside of the pillar arm 45. A lock nut 53 on the screw 49 is screwed up tight against the bottom of the pillar arm in order to lock the screw in adjusted position to maintain the upstanding pin in vertically adjusted position.

In all forms of the invention it will be noted that some means is provided on a part of the microscope moved by the coarse adjustment for engaging a stationary part of the microscope to prevent the adjustable part being moved downward to a dangerous point past the focusing point of the instrument. In all cases, a bar or other device is provided which extends across, above, below, or through the fine adjustment body when making the contact between the stationary part and the coarse adjustment. The device in all instances stops the action of both the coarse and the fine adjustment at a predetermined point of travel toward the object slide.

In some instances it may not be necessary to equip the bar 22 shown in Figure 1 with a foot and accordingly, as best shown in Figure 8, the bar designated by the numeral 54 may be simply a straight bar adapted to fit on top of the body tube slide or rack 55 and to be secured thereto by a screw 56 and a pin 57. The bar is equipped with a motion limiting screw 58 similar to the like screw 24 shown in Figure 1 and having a knurled head 59. The screw is secured in adjusted positions on the bar by a lock nut 60.

From the above description it is thought that the construction and operation of the invention will be fully understood without further explanation.

What is claimed is:

1. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, an objective, a stage for supporting an object slide, means providing an adjustable control of the free working distance between the microscope objective and the object slide, comprising a bar extending from the coarse adjustment body across the fine adjustment body to the pillar arm, and an adjusting screw between said pillar arm and the bar adapted to stop movement of the bar at a predetermined point in its travel as a unit with the coarse adjustment body.

2. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, means carried as a unit by the coarse adjustment body and engageable with the stationary pillar arm to limit downward movement of the coarse adjustment body beyond a predetermined point past the focusing point, said means extending freely and transversely across the fine adjustment body.

3. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, an objective, a stage for supporting an object slide, an adjustable stop member extending from the coarse adjustment body across the fine adjustment body and adapted to engage the stationary pillar arm for providing an adjustable control of the free working distance between the microscope objective and the object slide.

4. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, a slide supporting stage, an objective, a bar extending from the coarse adjustment body across the fine adjustment body and overhanging the pillar arm, and a member carried by the bar forming a stop adapted to engage the pillar arm and prevent contact of the objective with an object slide.

5. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, a stage for supporting an object slide, an objective, a bar mounted between its ends on the pillar arm and extending across the fine adjustment body to the coarse adjustment body, a stop pin secured to the coarse adjustment body adapted to engage the end of the bar and hold the coarse adjustment body against movement toward the object slide, and means between the other end of the bar and the pillar arm for adjusting the free end of the bar vertically.

6. A microscope having a stationary pillar arm, a fine adjustment body mounted for vertical adjustment on the pillar arm, a coarse adjustment body mounted for vertical adjustment on the fine adjustment body, the fine adjustment body being disposed between the coarse adjustment body and the pillar arm, a slide supporting stage, an objective, a bar secured to the bottom of the pillar arm and extending across the fine adjustment body, the free end of said bar being offset, and a pin extending upwardly from the free end of said bar in the path of movement of the coarse adjustment body and adapted to engage the coarse adjustment body and prevent movement of the coarse adjustment body toward the slide supporting stage.

7. A microscope having a stationary member, a fine adjustment body mounted for vertical adjustment on the stationary member, a coarse adjustment member mounted for vertical adjustment on the fine adjustment body, the fine adjustment body being disposed between the coarse adjustment member and the stationary member, bar means attached to one of said members, the free end of said bar means bridging the fine adjustment body, and contact means coacting with the free end of the bar means and with the other of said members for stopping vertical movement of both the coarse adjustment member and the fine adjustment body at a predetermined point.

RAYMOND D. ALLISON.